United States Patent [19]

Bergstein

[11] Patent Number: 5,088,884

[45] Date of Patent: * Feb. 18, 1992

[54] ROTOR ASSEMBLY FOR FLUID DRIVEN ENGINE

[76] Inventor: Frank D. Bergstein, 11464 Lippelman Rd., Ste. 200, Cincinnati, Ohio 45246

[*] Notice: The portion of the term of this patent subsequent to Oct. 2, 2007 has been disclaimed.

[21] Appl. No.: 586,893

[22] Filed: Sep. 24, 1990

Related U.S. Application Data

[63] Continuation-in-part of Ser. No. 397,519, Aug. 23, 1989, Pat. No. 4,960,363.

[51] Int. Cl.$^5$ .................................................. F03D 7/00
[52] U.S. Cl. ...................................... 415/3.1; 384/125; 384/245
[58] Field of Search ............... 415/2.1, 3.1, 4.2, 4.4, 415/170.1, 229, 905, 906, 907; 384/245, 125, 97

[56] References Cited

U.S. PATENT DOCUMENTS 4,789,476  1/1989  Sakatani et al. ............... 384/245
4,960,363  10/1990  Bergstein ........................ 415/3.1

FOREIGN PATENT DOCUMENTS 112879  9/1980  Japan ................................ 415/2.1

Primary Examiner—John T. Kwon
Attorney, Agent, or Firm—Frost & Jacobs

[57] ABSTRACT

A rotor having an elongated cylindrical body which surrounds a vertically disposed bearing shaft fixedly secured at its lowermost end to a supporting base, the rotor mounting a bearing pad at its uppermost end positioned to be seated on the upper end of the bearing shaft so as to rotatably suspend the rotor from the bearing shaft, stabilizers being provided to maintain concentric rotation of the rotor about the bearing shaft as the rotor is driven by a flowing fluid.

10 Claims, 2 Drawing Sheets

ROTOR ASSEMBLY FOR FLUID DRIVEN ENGINE

This is a continuation-in-part of co-pending application Ser. No. 07/397,519 filed Aug. 23, 1989 now U.S. Pat. No. 4,960,363 and entitled FLUID FLOW DRIVEN ENGINE.

The present invention relates to fluid flow driven engines, and more particularly to an improved rotor construction for use in such engines.

BACKGROUND OF THE INVENTION

The increasing energy demands of industrialized and developing nations combined with the increased concern for environmental effects of fossil fuel use have placed a greater emphasis and need on developing clean and efficient alternative energy sources. If properly harnessed, the title flows of oceans and rivers, as well as the force of the wind, can efficiently generate vast amounts of clean energy.

The prior art discloses numerous devices for harnessing the energy of flowing fluids. Many of these devices utilize one or more rotors having blades or impellers which are caused to rotate by the flowing fluid. While great attention has been paid to the configuration of the rotors and the blades which drive them, little attention has been paid to the manner in which the rotors are mounted. Generally speaking, they are mounted on an axle which is fixedly secured to the rotor, the opposite ends of the axle being rotatably journaled in various types of conventional bearings A major problem with conventional bearings is the hostile environment in which they are being used, which in many instances is under water. Ideally, the bearings in fluid driven motors should minimize resistance to the rotation of the rotors, but often this is impossible to accomplish due to the size of the rotors and the environment in which they are operated.

SUMMARY OF THE INVENTION

In contrast to the conventional mounting of rotors for fluid driven motors as characterized above, the present invention contemplates a unique rotor assembly wherein the rotor, irrespective of its size, is seated at its upper end on a fixed bearing shaft, the rotor being rotatable about the fixed bearing shaft.

In accordance with the invention, a vertical bearing shaft is fixedly secured at its lowermost end to a base which may be seated on the bottom of a river or other body of water, or which may be appropriately mounted at or above ground level if the engine is to be powered by the wind. The rotor comprises an elongated cylindrical body adapted to surround the bearing shaft with its longitudinal axis coinciding with the longitudinal axis of the bearing shaft, the rotor body mounting a plurality of circumferentially spaced blades or impellers which are acted upon by the flowing fluid to effect rotation of the rotor.

A single bearing pad is mounted at or near the upper end of the rotor and positioned to be seated on the upper end of the bearing shaft, which is preferably rounded, thereby minimizing bearing contact between the end of the bearing shaft and the bearing pad, the bearing pad acting to mount the rotor for rotation about the bearing shaft.

Since the rotor is effectively suspended from the bearing shaft solely by contact of the bearing pad with the upper end of the bearing shaft, it is desirable to stabilize the rotor against eccentric rotation, and to this end various forms of stabilizers may be provided to insure that the rotor will rotate in a concentric path about its axis of rotation. The stabilizers may take different forms, inclusive of the use of stabilizer sleeves of various lengths or spiders which are fixedly secured to the rotor and closely surround the bearing shaft. The use of a full length stabilizer sleeve permits the rotor to be sealed and hence rendered airtight, which is advantageous in underwater applications wherein it is desired to utilize the rotor as a buoyancy chamber to effectively counteract the weight of the rotor when submerged.

It is thus an object of the present invention to provide an improved rotor assembly for fluid driven engines which is of simple and inexpensive construction, which is simple and easy to maintain, and which has a long service life even under adverse conditions of use, and which provides minimum frictional resistance to the free rotation of the rotor.

DESCRIPTION OF THE PREFERRED EMBODIMENTS

Figure 1:
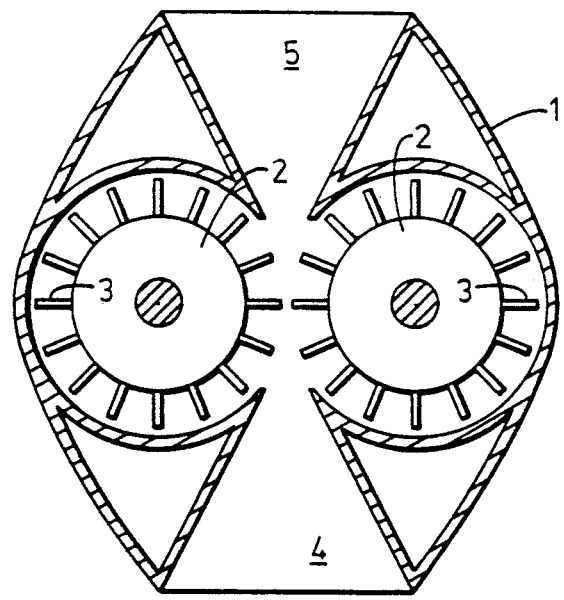
FIG. 1 is a diagramatic horizontal sectional view of one form of driven motor with which rotor assemblies of the present invention may be utilized.
Figure 2:
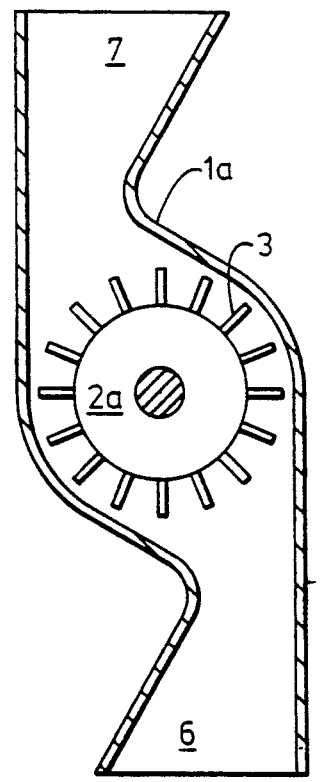
FIG. 2 is a diagramatic horizontal sectional view of another form of driven motor with which the rotor assembly of the present invention may be used.

Referring first to FIGS. 1 and 2 of the drawings, these drawings illustrate exemplary types of fluid driven engines with which the rotor assembly of the present invention may be utilized. It is to be understood, however, that the utility of the invention is not limited to any particular form of fluid driven engine, the only prerequisite being that the rotors are mounted for rotation about a vertical axis.

In the embodiment of FIG. 1, the engine 1 has a pair of vertical rotors 2 mounting a series of rotor blades or impellers 3, the rotors 2 being placed in closely spaced relations so as to define a fluid flow passageway therebetween so that a fluid passing through the passageway in either direction will strike the impellers 3, thereby causing the rotors to rotate in opposite directions. Passageways 4 and 5 taper inwardly so as to provide a Venturi effect as the fluid flows between the rotors.

In the embodiment of FIG. 2, a single rotor 2a is utilized, the housing la in this instance being configured to provide diametrically opposed passageways 6 and 7 which are offset relative to the axis of rotation of the rotor so that the rotor 2a will always rotate in the same direction irrespective of the direction of fluid flow. As will be understood by the worker in the art, the rotors 2 and 2a will be operatively connected through suitable drive means to a generator or other device adapted to be powered by the fluid engine.

Figure 3:
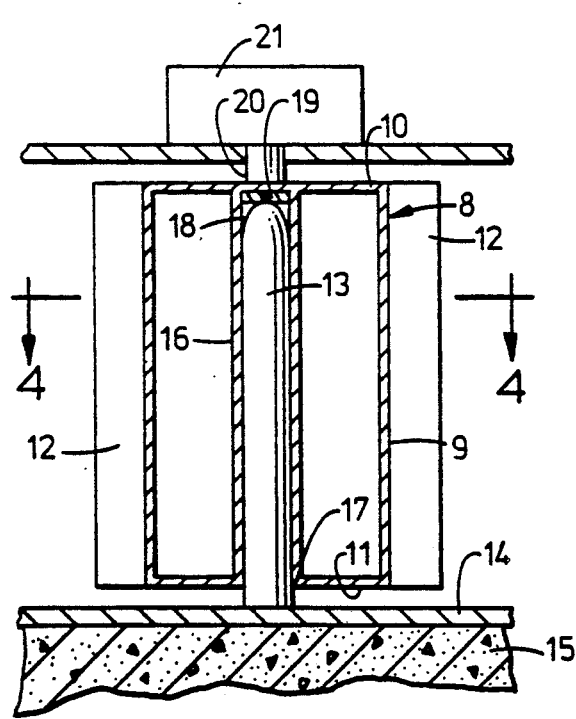
FIG. 3 is a vertical sectional view of a rotor assembly in accordance with the invention utilizing a full length stabilizer sleeve.

With the foregoing background in mind, reference is next made to FIG. 3 of the drawings which illustrates a rotor assembly in accordance with the present invention. In this embodiment, the rotor 8 is in the form of a cylindrical drum having an annular wall 9 and enclosing upper and lower end walls 10 and 11, respectively. The rotor 8 mounts a series of impellers 12 which are circumferentially spaced relative to each other and project radially outwardly from the drum. The impellers may be planar, or they may be of curved or other non-linear configuration.

The rotor 8 is adapted to be mounted on a vertically disposed bearing shaft 13 which is fixed at its lower end to a base 14 which, in the embodiment illustrated, is supported on a foundation 15. The bearing shaft 14 is closely surrounded by a sleeve 16 which serves to stabilize the rotor 8 on the bearing shaft 13, the sleeve 16 being sealed at its opposite ends to the end walls 10 and 11, thereby sealing the interior of the rotor so that it will be airtight. It will be understood, of course, that the bottom wall 11 of the rotor will be provided with an annular opening 17 to receive the bearing shaft 13.

The bearing shaft 13 terminates at its upper end in a rounded or tapered head 18 on which is seated a bearing pad 19 mounted at the upper end of the sleeve 16. The rotor 8 is thus suspended from and rotatably journaled on the fixed bearing shaft 13 by means of the bearing pad 19, which preferably comprise a lubric material, such as Nylatron G.S. In order to further reduce friction and enhance rotation of the rotor, the sealed rotor may be filled with sufficient ballast, such as water or sand, so that the rotor, when submerged in a flowing body of water, will be in an essentially equilibrium condition, i.e., the weight of the rotor will be offset by its buoyancy when submerged, so that it will be effectively weightless. While it is preferred that the head 18 of the bearing shaft 13 be rounded or tapered, the head 18 may be essentially flat and provided with one or more concentric bearing rings positioned to bear against the bearing pad 19.

Since the rotor 8 does not have a conventional axle, it is provided at its upper end with an extension or drive shaft 20 which is fixedly secured to the rotor 8 and hence rotates with it, the extension being operatively connected to an overlying gear unit 21 which will operatively connect the rotor to a generator or other device intended to be driven by the fluid engine.

Figure 4:
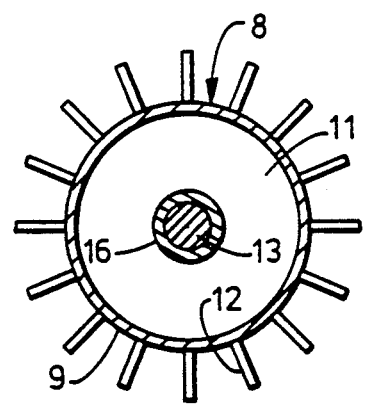
FIG. 4 is a horizontal sectional view taken along the line 44 for FIG. 3.
Figure 5:
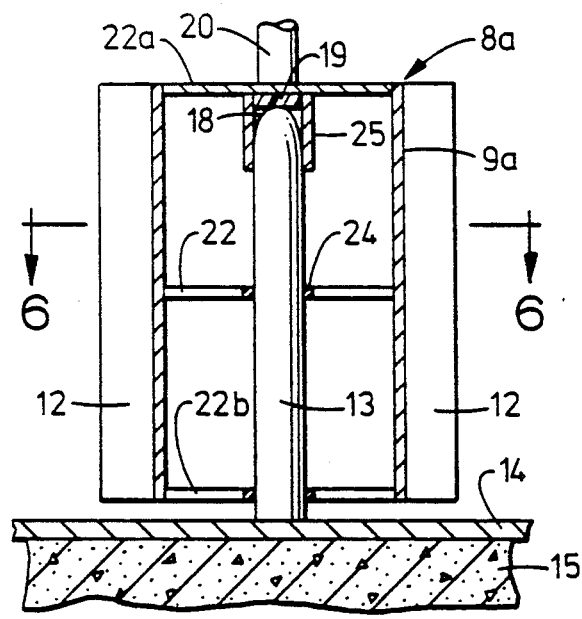
FIG. 5 is a vertical sectional view of an embodiment of the invention utilizing a spider to mount the bearing pad with additional spiders serving as stabilizers.
Figure 6:
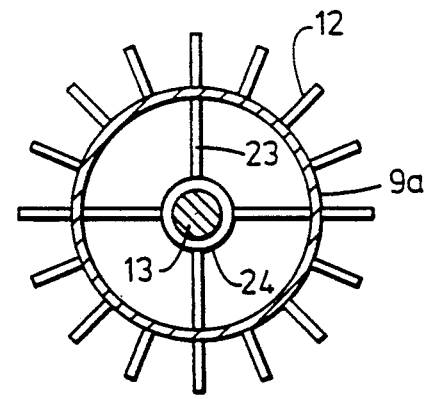
FIG. 6 is a horizontal sectional view taken along the line 6—6 of FIG. 5.

FIG. 5 illustrates a modification of the rotor assembly wherein like parts have been given like reference numerals. In this embodiment the rotor 8a consists essentially of a tubular cylindrical body 9a defining an annular wall to which the impellers 12 are secured. The cylindrical body 9a mounts a series of vertically spaced apart spiders 22, 22a and 22b, each such spider having a plurality of arms 23 extending between the annular wall 9a and a central collar 24, as seen in FIG. 4. In the case of spiders 22 and 22b, the collars 24 are of a size to closely surround the bearing shaft 13. The uppermost spider 22a mounts an elongated downwardly extending collar 25 which surrounds the head 18 of bearing shaft 13, the collar mounting the bearing pad 19 on which the head 18 of the bearing shaft 13 is seated. The number of spiders may vary consistent with the objective of stabilizing the rotor against eccentric movement while minimizing fricitonal resistance.

Figure 7:
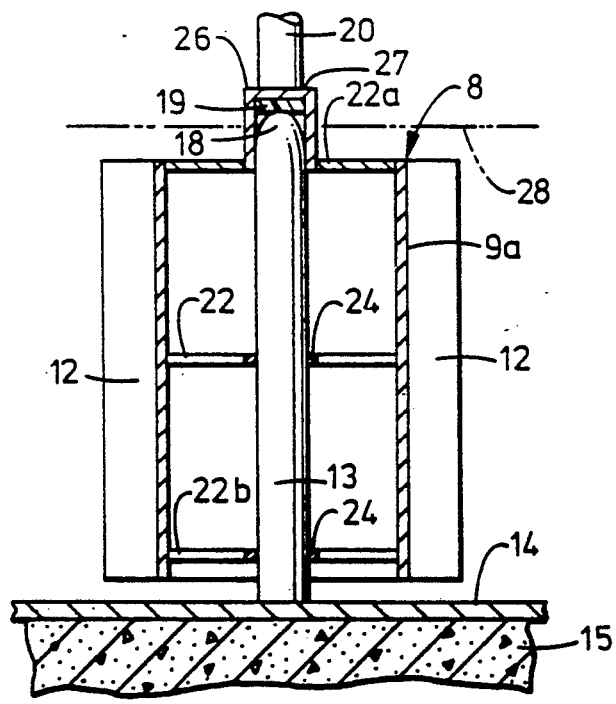
FIG. 7 is a vertical sectional view of a further modification of the invention.

The embodiment of FIG. 7 is similar to the embodiment of FIG. 5, but in this instance the uppermost spider 22a mounts an upwardly projecting elongated collar 26 having a closed upper end 27 in which the bearing pad 19 is mounted. In this instance, the bearing shaft 13 is of a length to project upwardly into the elongated collar 26 which lies beyond the upper end of the rotor. With this arrangement the bearing pad 19 may be positioned above the surface of the body of water in which the rotor is submerged, such surface being indicated by the dashed line 28, thereby maintaining the bearing pad in essentially dry condition during use.

Figure 8:
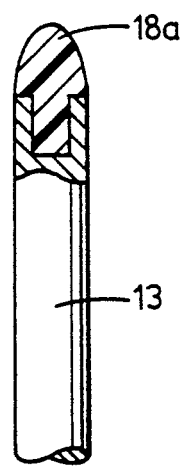
FIG. 8 is a fragmentary elevational view of a bearing shaft with a lubric top.

Modifications may be made in the invention without departing from its spirit and purpose. A number of modifications have already been set forth, and others will be apparent to the skilled worker in the art. For example, and as seen in FIG. 8, the tip 18a of bearing shaft 13 may be formed from a different material than the shaft itself, and may also comprise a lubric material. Similarly, the collars of the spiders 22 and 22b may be lined with a lubric material. As should now be apparent, the present invention provides a rotor assembly for a fluid flow driven engine which is of basically simple and inexpensive construction and yet designed to achieve optimum operating efficiency.

I claim:

1. A rotor assembly for a fluid driven engine, said rotor assembly comprising:
   a base;
   a vertical bearing shaft fixedly secured at its lowermost end to said base;
   a rotor having an elongated cylindrical body surrounding said bearing shaft with its longitudinal axis coinciding with the longitudinal axis of said bearing shaft, whereby said rotor is rotatably spaced impellers projecting radially outwardly from said cylindrical body;
   a bearing pad mounted on said rotor, said bearing pad being positioned to seat on the upper end of said bearing shaft, whereby Said rotOr iS rotatably journaled on said bearing shaft by means of said bearing pad; and
   stabilizing means on said rotor surrounding said bearing shaft.

2. The rotor assembly claimed in claim 1 wherein said bearing shaft has a rounded upper end in contact with said bearing pad.

3. The rotor assembly claimed in claim 2 wherein said bearing pad is formed from a lubric material.

4. The rotor assembly claimed in claim 2 wherein the rounded upper end of said bearing shaft is formed from a lubric material.

5. The rotor assembly claimed in claim 1 wherein said stabilizing means comprises an elongated sleeve fixedly secured to said cylindrical body and closely surrounding said bearing shaft, said bearing pad being mounted at the upper end of said sleeve.

6. The rotor assembly claimed in claim 5 including end walls at the opposite ends of said cylindrical body, said end walls sealing the space between said cylindrical body and said sleeve, whereby to constitute said cylindrical body an air tight buoyancy compartment.

7. The rotor assembly claimed in claim 1 wherein said stabilizing means comprises a plurality of spiders extending inwardly from said cylindrical body, each spider having a collar surrounding said bearing shaft.

8. The rotor assembly claimed in claim 7 wherein one of said plurality of spiders is an uppermost spider lying at the uppermost end of said cylindrical body, and wherein said uppermost spider mounts said bearing pad.

9. The rotor assembly claimed in claim 8 wherein said uppermost spider mounts a downwardly projecting collar which closely surrounds the uppermost end of said bearing shaft, and wherein said bearing pad is mounted in said collar.

10. The rotor assembly claimed in claim 8 wherein said uppermost spider mounts an upwardly projecting collar surrounding the upper end of said bearing shaft, said bearing shaft projecting upwardly beyond the uppermost end of said cylindrical body, said bearing pad being mounted in said collar.

* * * * *

UNITED STATES PATENT AND TRADEMARK OFFICE
CERTIFICATE OF CORRECTION

PATENT NO. : 5,088,884
DATED     : February 18, 1992
INVENTOR(S): Frank D. Bergstein It is certified that error appears in the above-identified patent and that said Letters Patent is hereby corrected as shown below:

Column 4 - Claim 1 - Line 35 - "whereby said rotor is rotatably" should be deleted and replaced with --and a plurality of circumferentially--.

Column 4 - Claim 1 - Line 40 - "Said rotor is" should be deleted and replaced with --said rotor is--.

Signed and Sealed this

Eighth Day of June, 1993

Attest:

MICHAEL K. KIRK

Attesting Officer

Acting Commissioner of Patents and Trademarks